United States Patent Office 3,351,574
Patented Nov. 7, 1967

3,351,574
CASTOR OIL POLYGLYCIDYL ETHER
Darrel D. Hicks and William J. Belanger, Louisville, Ky., assignors to Celanese Coatings Company, a corporation of Delaware
No Drawing. Filed Feb. 24, 1965, Ser. No. 435,042
8 Claims. (Cl. 260—18)

ABSTRACT OF THE DISCLOSURE

Polyglycidyl ethers of castor oil, which are useful as curable compositions when blended with an epoxy resin curing agent.

---

This invention relates to novel epoxide compositions. More particularly, this invention pertains to the polyglycidyl ether of castor oil. In another aspect, the invention relates to novel blends containing the polyglycidyl ether of castor oil and to thermoset compositions made from these blends.

Castor oil is a vegetable oil obtained from the seeds of the castor plant and is a triester of glycerol and substantially ricinoleic acid (12-hydroxy-9-octadecenoic acid). Ricinoleic acid is an 18 carbon atom acid which contains a hydroxyl group in the hydrocarbon chain. The typical analysis of the fatty acid portion of castor oil is:

| | Weight percent |
|---|---|
| Ricinoleic acid | 86–92 |
| Linoleic acid | 3–6 |
| Oleic acid | <1–8.5 |
| Stearic acid | 1–2 |
| Palmitic acid | 1–2 |

The typical constants for castor oil are:

| | |
|---|---|
| Iodine value | 81–91 |
| Saponification value | 176–187 |
| Hydroxyl number | 158–164 |
| Melting point, °C. | −10 to −12 |

Castor oil contains approximately 3 hydroxyl groups per molecule and can be considered as a polyol in various reactions. This invention contemplates utilizing castor oil as a polyol for preparing castor oil polyglycidyl ether. By the process of this invention, castor oil is reacted with an epihalohydrin in the ratio of 1 mol of castor oil to about 1.1 to about 6 mols of epihalohydrin with a Lewis acid catalyst to form a polyhalohydrin ether of castor oil, and subsequently, the polyhalohydrin ether of castor oil is dehydrohalogenated with an alkaline dehydrohalogenating agent to form castor oil polyglycidyl ether.

Castor oil polyglycidyl ether when reacted with an epoxy resin curing agent either alone or in admixture with a different polyepoxide compound produces thermoset compositions having utility as potting, molding, encapsulating, and laminating compounds and the like.

Castor oil and an epihalohydrin, in the presence of a Lewis acid catalyst, form castor oil polyhalohydrin ethers by addition of the epoxide groups of epihalohydrin to hydroxyl groups of the castor oil. The Lewis acids that can be used to catalyze this addition reaction include boron trifluoride and its complexes, such as boron trifluoride etherate, aluminum chloride, aluminum bromide, zinc chloride, ferric chloride, stannic chloride, sulfuric acid, phosphoric acid and the like. The amount of catalyst used is a catalytic quantity, generally from about 0.1 to about 5 weight percent based on the weight of the reactants.

The addition reaction of castor oil and epihalohydrin can be conducted by simply mixing the components along with the catalyst, while controlling the temperature of reaction by external cooling. However, because of the exothermic nature of this addition reaction, a preferred method is to add the epihalohydrin slowly to the castor oil and catalyst. By this latter method, the exothermic reaction can be controlled more readily. The addition reaction is carried out at temperatures ranging from about 10° C. to about 150° C., the preferred temperature range being from about 50° C. to about 100° C.

To form the polyhalohydrin ether of castor oil, about 2 to about 3 mols of epihalohydrin are generally reacted with 1 mol of castor oil. When less than 2 mols of epihalohydrin are reacted with 1 mol of castor oil, a considerable amount of monohalohydrin ethers are produced. These mono-ethers, when converted to the glycidyl ethers, yield monofunctional epoxide compounds which do not cure satisfactorily. However, these monofunctional glycidyl ethers have utility as reactive diluents, stabilizers and extenders in various resinous systems. In order to produce usable compositions as contemplated by this invention, more than 1 mol of epihalohydrin, at least about 1.1 mols, are reacted with 1 mol of castor oil.

When more than 3 mols of epihalohydrin are reacted with 1 mol of castor oil and the resulting polyhalohydrin ether is dehydrohalogenated, glycidyl ethers are produced that contain a considerable amount of halogen. These high halogen containing compounds have found utility in flame proofing compositions. However, the halogen has some detrimental effects in the cured resin, especially in electrical properties and in caustic resistance. In order to obtain the advantages of the halogen while minimizing its detrimental effects, no more than about 6 mols of epihalohydrin should be reacted per mol of castor oil. The range of epihalohydrin to castor oil contemplated in this invention is about 1.1 to about 6 mols of epihalohydrin to 1 mol of castor oil, with the prefered range being about 2 to about 3 mols of epihalohydrin per mol of castor oil.

The polyhalohydrin ethers of castor oil are dehydrohalogenated with an alkaline dehydrohalogenating agent to produce the glycidyl ethers. Such alkaline dehydrohalogenating agents include alkali metal hydroxides, alkaline earth metal hydroxides, and alkali metal complex salts, such as the alkali metal aluminates, silicates and zincates. The amount of alkaline compound used to dehydrohalogenate the polyhalohydrin ethers is approximately equivalent to the halohydrin content of the polyhalohydrin ethers, i.e., about 0.8 to about 1.2 equivalents of alkaline agent per halohydrin group of the castor oil polyhalohydrin ether. A halohydrin group is defined as an organic radical containing a hydroxyl group on one carbon atom and a halogen atom on an adjacent carbon atom,

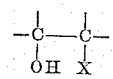

wherein X is halogen. When 3 mols or less of epihalohydrin are reacted with one mol of castor oil, i.e., when the epihalohydrin used is equivalent to or less than equivalent to the hydroxyl groups of the castor oil, the halohydrin groups formed are substantially equal to the amount of epihalohydrin reacted.

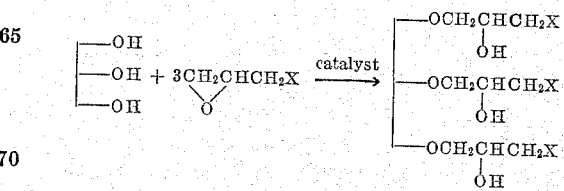

However, when more than 3 mols of epihalohydrin are reacted with 1 mol of castor oil, only 3 halohydrin groups are formed. This is due to the fact that the epihalohydrin, which is in excess of 3 mols, reacts with the hydroxyl groups of the formed halohydrin in producing a new halohydrin group but eliminating the first halohydrin group.

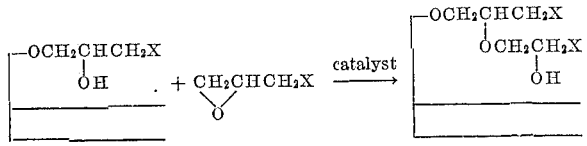

The number of halohydrin groups that are formed when epihalohydrin is reacted with castor oil can readily be determined by those skilled in the art.

The dehydrohalogenation of the halohydrin ethers of caster oil to the glycidyl ethers can be caried out by adding an alkaline dehydrohalogenating agent, in dry form, dispersed in an organic liquid or dissolved in water, to the castor oil polyhalohydrin ether in no solvent or dissolved in an organic solvent, followed by heating the reactants until the dehydrohalogenation is complete. However, the prefered method is to dehydrohalogenate the castor oil polyhalohydrin ether dissolved in epihalohydrin. The dehydrohalogenation reaction is conducted at a temperature range of 50° C. to about 150° C., the preferred temperature range being 60° C. to about 100° C.

Castor oil polyglycidyl ethers are low viscosity liquids, having viscosities ranging from about 200 to about 800 cps. at 25° C., with epoxide equivalent weights of about 450 to 1000 and halogen content of about 2 percent to about 7 percent. These properties are dependent upon the ratio of epihalohydrin to castor oil initially reacted. Castor oil polyglycidyl ethers when reacted with epoxide resin curing agents produce soft, pliable thermoset compositions.

Castor oil polyglycidyl ethers have considerable utility when reacted in admixture with conventional epoxide resins and curing agents. Thermoset compositions having excellent flexibility, electrical resistance, chemical resistance and related properties are so produced.

Epoxide compounds that can be used in combination with the castor oil polyglycidyl ethers are those compounds having more than one 1,2 epoxy group per molecule. They can be saturated or unsaturated, aromatic, aliphatic, cycloaliphatic or heterocyclic. They can be monomeric or polymeric in nature.

The polyepoxide resins include epoxidized hydrocarbons, such as vinyl cyclohexene dioxide, butadiene dioxide, dicyclopentadiene dioxide, epoxidized polybutadiene and limonene dioxide. Other epoxide compounds are epoxidized esters, for example epoxidized unsaturated vegetable oils, epoxidized soybean oil, epoxidized glycerol trilinoleate and 3,4-epoxy-6-methylcyclohexyl-methyl-3,4-epoxy-6-methylcyclohexanecarboxylate. Still other epoxides are polymers and copolymers of vinyl polymerizable monoepoxides, such monoepoxides being allyl glycidyl ether, glycidyl acrylate and glycidyl methacrylate.

Additional polyepoxides for use in the compositions of this invention include glycidyl ethers of polyhydric phenols obtained by reacting a polyhydric phenol in an excess of epichlorohydrin with sodium hydroxide. Such polyhydric phenols include bisphenol A (p,p'-dihydroxy-diphenyl propane), resorcinol, hydroquinone, 4,4'-dihydroxybenzophenone, bis(4-hydroxyphenyl) ethane, 1,5-dihydroxynaphthalene, 4,4'-dihydroxybiphenyl, novolak resins containing more than two phenol moieties linked through methylene bridges, and the like.

Other glycidyl polyethers are polymers prepared by reacting 1.2 up to about 2 mols of epichlorohydrin with 1 mol of a dihydric phenol or by reacting diepoxides with added dihydric phenol.

The compositions of this invention also include polyglycidyl ethers of polyhydric alcohols, made by reacting a polyhydric alcohol and an epichlorohydrin with an acidic catalyst such as boron trifluoride, and subsequently treating the resulting product with an alkaline material. Included among the polyhydric alcohols that can be used in the preparation of these polyepoxides are glycerine, ethylene glycol, propylene glycol, diethylene glycol, hexanetriol, pentaerythritol, trimethylol ethane, trimethylol propane, etc. In addition, polyhydric ether alcohols, for instance, diglycerol, dipentaerythritol, polyalkylene glycols and hydroxyalkyl ethers of the aforementioned polyhydric phenols can be used.

Also included in the compositions of this invention are glycidyl esters of polycarboxylic acids, such acids being azelaic acid, terephthalic acid, dimerized and trimerized unsaturated fatty acids, etc.

Other polyepoxide resins useful in this invention are described in "Epoxy Resins" by Lee and Neville, McGraw-Hill Book Company, Inc., 1957.

The amount of castor oil polyglycidyl ether that can be used with the different epoxide compounds will, of course, vary with the desired end use of the thermoset compositions, with the type epoxide compound used, and with the type curing agent used. Such amounts can be trace amounts of the castor oil polyglycidyl ether, say 1 to 2 percent based on the weight of the total epoxide blend, up to substantially all castor oil polyglycidyl ether, say 98 to 99 percent. However, the preferred amounts are about 10 weight percent to about 80 weight percent of castor oil polyglycidyl ether, with the most preferred being 30 perecnt to 50 percent.

The blends of castor oil polyglycidyl ethers and different epoxide compounds are simply made by mixing the components together. Heat may be used to facilitate the mixing if desired.

Curing agents that are used to cure the castor oil polyglycidyl ethers and blends of the castor oil polyglycidyl ethers with different epoxide compounds are the well known epoxide resin curing agents. Such agents are primary, secondary, and tertiary amines, quaternary ammonium compounds, Friedel-Crafts catalysts, polyamidoamines, and organic polycarboxylic acids and their anhydrides. Illustrative of the amine curing agents are ethylene diamine, diethylene, triamine, diethylamino propylamine, piperadine, menthane diamine, benzyl dimethyl amine, diaminodiphenyl sulphone, dicyandiamide and iminobispropylamine. Also useful are the polyamido-amines which are the reaction products of an excess of polyamines with monomeric or polymeric fatty acids. The amine curing agents are used in the amounts of about 0.5 to 1.5 equivalents of amine hydrogen per epoxide group of the epoxide resin composition. On a weight basis, the amount of amine curing agent will be from about 5 to about 50 parts of the amine compound to 100 parts of the epoxide containing composition. The preferred amounts will vary, of course, with the particular amine being used, the epoxide resin, the amount of castor oil polyglycidyl ether and the end use of the cured product. Such variations can be readily determined by those skilled in the art.

The polycarboxylic acid and anhydride curing agents can be saturated or unsaturated, aliphatic, cycloaliphatic, aromatic or heterocyclic. Examples of these acids and anhydrides include phthalic anhydride, tetrahydrophthalic anhydride, hexahydrophthalic anhydride, hexachloro-endomethylenetetrahydrophthalic anhydride, maleic anhydride, succinic anhydride, dodecylsuccinic acid anhydride, pyromellitic, dianhydride, polyadipic acid anhydride, and the acids of these anhydrides, as well as azelaic acid, dimerized and trimerized unsaturated fatty acids, and polymers and copolymers of vinyl polymerizable acids. The amount of acid or anhydride that is used to cure the modified polyepoxide resins ranges from about 0.5 to about 1.5 acid or anhydride groups for each epoxide group of the epoxide containing composition. The preferred amounts will vary with the compounds being used and the desired end use. Such amounts are deemed to be readily determinable by those skilled in the art.

Other suitable epoxide resin curing agents are disclosed in the book "Epoxy Resin," by Lee and Neville, McGraw-Hill Book Company, 1957.

If desired, other ingredients can be added to the novel compositions before they are cured. Such ingredients include fillers, pigments, dyes, plasticizers and the like in the amounts ordinarily employed for such purposes. Combinations of the compositions of this invention with other resins, such as alkyd resins, urea resins, melamine resins and phenolic resins can be readily cured to form useful products. Castor oil polyglycidyl ethers can also serve as plasticizers for various compositions, especially as plasticizer-stabilizers for polyvinyl chloride type resins.

The castor oil polyglycidyl ether compositions of this invention in combination with epoxide resin curing agents can be cured at room temperature or by heating them at a suitable temperature. The curing temperature can be varied between room temperature and up to 200° C. or higher. The desirable curing temperature will depend, of course, upon the compositions being used, such temperatures being readily determined by those skilled in the art.

The invention is illustrated by the following examples. "Parts," where used, is intended to mean parts by weight.

*Example 1*

To a suitable reaction flask were added 1336 parts of castor oil and 4 parts of boron trifluoride etherate. The flask contents were heated to 70° C. and epichlorohydrin (370 parts) was added dropwise to the flask over a period of two hours while holding the temperature at 70–75° C. After the addition of epichlorohydrin was complete, the reactants were heated at 85–90° C. for 30 minutes to complete the reaction of the epichlorohydrin with the castor oil. The flask contents were then cooled to 35° C. and 4 parts of sodium hydroxide dissolved in 20 parts of water were added to neutralize the boron trifluoride catalyst. 3330 parts of epichlorohydrin were added to the flask to serve as a solvent. A distillation condenser was attached to the flask, and the flask contents were heated to 119° C. for a one-hour period while distilling off water and epichlorohydrin as an azeotrope. The water was separated from the distillate and the epichlorohydrin was returned to the flask.

The temperature of the flask contents was adjusted to 65–70° C. and 160 parts of sodium hydroxide were added in 4 equal increments over a period of 95 minutes. The flask contents were then held at 70° C. for 3 hours to complete the dehydrohalogenation. The excess epichlorohydrin was removed by distillation to a flask temperature of 150° C. under 20–30 mm. Hg pressure. The reaction product was dissolved in 600 parts of methyl isobutyl ketone and the solution was filtered to remove the salt. The solvent was then removed by distillation to a flask temperature of 150° C. under 20–30 mm. Hg pressure. 1671 parts of product was recovered, having an epoxide equivalent weight of 610, a chlorine content of 39 percent, a Gardner color of 5 and a viscosity at 25° C. of 275 cps.

*Example 2*

To a suitable reaction flask were added 1098 parts of castor oil and 3 parts of boron trifluoride etherate. The temperature of the flask contents was raised to 63° C. and 278 parts of epichlorohydrin were added over a period of 1 hour and 20 minutes. The temperature was raised to 90° C. for 1 hour to ensure complete reaction of the epichlorohydrin and castor oil. After cooling the reactants to 39° C., 3 parts of sodium hydroxide in 15 parts of water were added to neutralize the $BF_3$ catalyst. 2498 parts of epichlorohydrin were added as solvent for the castor oil polychlorohydrin ethers. The reactants were freed from water by distillation of water and epichlorohydrin to a flask temperature of 119° C. The epichlorohydrin in the distillate was separated from the water and was returned to the flask. The flask temperature was reduced to 68° C. and 120 parts of sodium hydroxide were added in 4 equal increments over a period of 1 hour and 30 minutes. The temperature of the reactants was gradually raised to 122° C. over a period of 3 hours and 30 minutes while distilling off the water formed during the reaction as a water-epichlorohydrin azeotrope. After cooling, the reactant solution was filtered to remove the salt formed during the reaction, and the filtrate was heated to 164° C. under vacuum (20–30 mm. Hg pressure) to distill off the excess epichlorohydrin. The resulting product (1345 parts) had an epoxide equivalent weight of 673 and a Gardner-Holdt viscosity at 25° C. of M.

*Example 3*

Using the same procedure as was described in Example 2, 933 parts of castor oil were reacted with 278 parts of epichlorohydrin under boron trifluoride etherate (3 parts) catalysis. The resulting polyhalohydrin ethers, after the addition of 3 parts of sodium hydroxide in 15 parts of water, were dissolved in 2498 parts of epichlorohydrin and were converted to polyglycidyl ethers with 120 parts of sodium hydroxide. The resulting product (1198 parts) had an epoxide equivalent weight of 570 and a Gardner-Holdt viscosity at 25° C. of L.

*Example 4*

Using the same procedure as was described in Example 2, 366 parts of castor oil were reacted with 139 parts of epichlorohydrin using 1 part of boron trifluoride catalyst, followed by dehydrohalogenation in excess epichlorohydrin (833 parts) with 40 parts of sodium hydroxide. The resulting product (498 parts) had an epoxide equivalent weight of 588 and a Gardner-Holdt viscosity at 25° C. of N.

*Example 5*

Using the same procedure as was described in Example 2, 622 parts of castor oil were reacted with 185 parts of epichlorohydrin by boron trifluoride etherate catalysis (2 parts) followed by dehydrohalogenation in excess epichlorohydrin (1665 parts) with 80 parts of sodium hydroxide. The resulting product (766 parts) had an epoxide equivalent weight of 556 and a Gardner-Holdt viscosity at 25° C. of K.

To 24.6 parts of the castor oil polyglycidyl ether product were added 5.4 parts of hexahydrophthalic anhydride. The reactants were heated with stirring until a clear solution was obtained. 0.1 part of dimethylaminomethylphenol was added and the solution was poured into a small aluminum moisture dish. After heating in an oven for 2 hours at 120° C. and 2 hours at 150° C., a well-cured, soft, flexible casting was obtained.

To 8.7 parts of the castor oil polyglycidyl ether product were added 11.7 parts of a glycidyl ether of p,p'-dihydroxydiphenyl propane (epoxide equivalent weight—190, viscosity at 25° C.—2,000 cps.), designated as Epoxide A, and 9.6 parts of hexahydrophthalic anhydride. The components were heated until a clear solution was obtained. 0.1 part of dimethylaminomethylphenol was added and the blend was poured into a small aluminum moisture dish. After heating for 2 hours at 120° C. and 2 hours at 150° C., a well-cured, hard, tough casting was obtained.

To 8 parts of the castor oil polyglycidyl ether were added 12 parts of Epoxide A and 7.4 parts of an amido-amine, which is the reaction product of a polyalkylene polyamine and a fatty acid, said amido-amine having an amine hydrogen equivalent weight of 90 and a viscosity of 300 cps. at 25° C. A portion of the resulting blend was poured into an aluminum moisture dish and was heated at 65° C. for 3 hours. The resulting well-cured casting was flexible and tough. The remaining portion cured after 3 days at room temperature.

The power factor and dielectric constant were determined at 77° F. and at 1 megacycle.

TABLE.—PHYSICAL AND ELECTRICAL PROPERTIES OF CURED BLENDS

|  | Blend 1 | Blend 2 | Blend 3 | Blend 4 | Blend 5 |
|---|---|---|---|---|---|
| Components: |  |  |  |  |  |
| COPGE | 20 | 30 | 40 | 50 | 60 |
| Epoxide A | 80 | 70 | 60 | 50 | 40 |
| HHPA | 56.2 | 51.6 | 47.2 | 42.8 | 38.5 |
| DMP-30 | 1.6 | 1.5 | 1.5 | 1.4 | 1.4 |
| Physical Properties: |  |  |  |  |  |
| Tensile: |  |  |  |  |  |
| Ultimate, p.s.i. | 9,773 | 8,255 | 5,610 | 2,659 | 1,416 |
| Initial Modulus | .19×10$^6$ | .18×10$^6$ | .13×10$^6$ | .04×10$^6$ | .004×10$^6$ |
| Elongation, percent | 6.7 | 10.7 | 19 | 50 | 69 |
| Flexure: |  |  |  |  |  |
| Ultimate, p.s.i. | 18,776 | 15,582 | 11,055 | (1) | (1) |
| Initial Modulus | .51×10$^6$ | .41×10$^6$ | .29×10$^6$ |  |  |
| Deflection, inch | .39 | .44 | 7.6 |  |  |
| Izod Impact: Ft. lb./in. notch | .50 | .62 | 1.08 | 2.12 | 3.31 |
| Hardness: |  |  |  |  |  |
| Shore "D" | 86 | 84 | 83 | 75 | 53 |
| Rockwell | 92 | 82 | 49 |  |  |
| Percent Water Absorption (24 Hours) | .12 | .12 | .14 | .19 | .25 |
| Heat Distortion Temp. (° C.) | 76.5 | 73 | 57 |  |  |
| Electrical Properties: |  |  |  |  |  |
| Power Factor | .017 | .016 | .017 | .025 | .036 |
| Dielectric Const. | 3.86 | 3.72 | 3.79 | 3.75 | 3.90 |
| Vol. Resistivity (Ohm-Cm.): |  |  |  |  |  |
| 77° F | 1.9×10$^{15}$ | 2.1×10$^{15}$ | 1.8×10$^{15}$ | 9.9×10$^{14}$ | 1.5×10$^{14}$ |
| 150° F | 5.7×10$^{14}$ | 1.8×10$^{14}$ | 1.4×10$^{13}$ | 1.6×10$^{12}$ | 3.5×10$^{11}$ |
| 200° F | 6.1×10$^{12}$ | 1.5×10$^{12}$ | 2.4×10$^{11}$ | 6.7×10$^{10}$ | 2.5×10$^{10}$ |
| 266° F | 4.6×10$^{10}$ | 2.4×10$^{10}$ | 7.3×10$^9$ | 3.8×10$^9$ | <10$^9$ |
| 302° F | 1.4×10$^9$ | 5.8×10$^9$ | <10$^9$ | <10$^9$ | <10$^9$ |

$^1$ No break.

To 25 parts of the castor oil polyglycidyl ether were added 50 parts of Epoxide A, 3.75 parts of boron trifluoride-ethyl amine complex. The components were heated to dissolve the catalyst and the blend was poured into a suitable tin coated steel mold. After heating for 4 hours at 150° C., a well-cured, somewhat flexible casting was obtained.

Comparable cures were obtained using the castor oil polyglycidyl ethers of Examples 1 through 4 in similar reactions.

*Example 6*

Using the same procedure as described in Example 2, 1336 parts of castor oil were reacted with 370 parts of epichlorohydrin by boron trifluoride-etherate catalysis (4 parts), followed by dehydrohalogenation in excess epichlorohydrin, (2960 parts) with 160 parts of sodium hydroxide. The resulting product (1675 parts) had an epoxide equivalent weight of 603 and a Gardner-Holdt viscosity at 25° C. of K.

The castor oil polyglycidyl ether produced was blended with Epoxide A, described in Example 5, in various proportions, hexahydrophthalic anhydride was dissolved in the blends and 2,4,6-tri(dimethylaminomethyl) phenol was added as catalyst. The resulting solutions were poured in molds and were cured by heating for 2 hours at 99° C. and 2 hours at 204° C. The cured castings were then evaluated for physical and electrical properties. The proportions of components used and the resulting properties are listed in the table. COPGE is castor oil polyglycidyl ether, HHPA is hexahydrophthalic anhydride, and DMP-30 is 2,4,6-tri(dimethylaminomethyl) phenol.

Castor oil polyglycidyl ether was miscible in all proportions with epoxidized polymers of butadiene and with 3,4-epoxy-6-methylcyclohexylmethyl-3,4-epoxy-6-methylcyclohexanecarboxylate, as well as with the glycidyl polyethers of dihydric phenols. Well cured products were obtained with these blends and polycarboxylic acid anhydrides.

It is to be understood that the foregoing detailed description is given merely by way of illustration and that many variations may be made therein without departing from the spirit of the invention.

The embodiments of the invention in which an exclusive property or privilege is claimed are defined as follows.

We claim:
1. Castor oil polyglycidyl ether.
2. A blend of castor oil polyglycidyl ether and a different polyepoxide containing more than one 1,2 epoxy group per molecule.
3. The composition of claim 2 wherein the polyepoxide is a polyglycidyl ether of a polyhydric phenol.
4. A curable composition comprising castor oil polyglycidyl ether and an epoxy resin curing agent.
5. The composition of claim 4 wherein the epoxy resin curing agent is a polycarboxylic acid anhydride.
6. A curable composition comprising castor oil polyglycidyl ether, a different polyepoxide containing more than one 1,2 epoxy group per molecule and an epoxy resin curing agent.
7. The composition of claim 6 wherein the polyepoxide is a diglycidyl ether of a dihydric phenol and the epoxy resin curing agent is a polycarboxylic acid anhydride.
8. The cured composition of claim 7.

References Cited

UNITED STATES PATENTS

| | | | |
|---|---|---|---|
| 2,260,753 | 10/1941 | Marple et al. | 260—348.6 X |
| 2,581,464 | 1/1952 | Zech | 260—348.6 X |
| 2,925,426 | 2/1960 | Schroeder | 260—348 |
| 2,984,679 | 5/1961 | Ehrlich | 260—348 X |
| 2,992,239 | 7/1961 | Nevin et al. | 260—348.6 |

DONALD E. CZAJA, *Primary Examiner.*

C. W. IVY, *Assistant Examiner.*